P. V. HUNTER.
CABLE FOR ELECTRIC CURRENT DISTRIBUTING SYSTEMS.
APPLICATION FILED FEB. 14, 1912. RENEWED SEPT. 5, 1913.
1,088,902.
Patented Mar. 3, 1914.
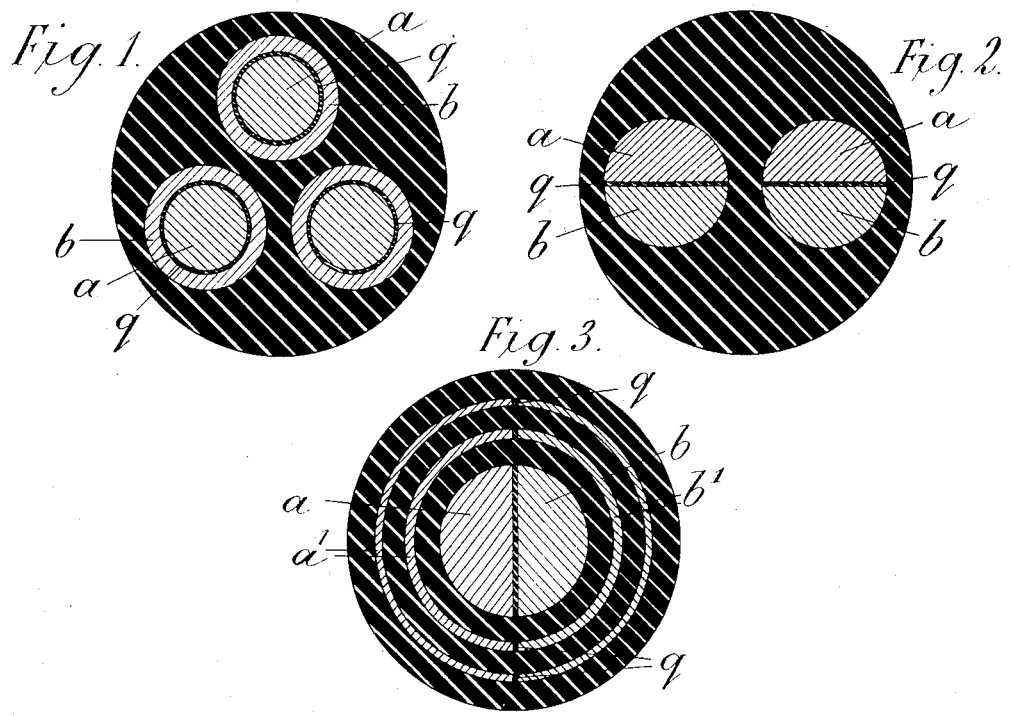
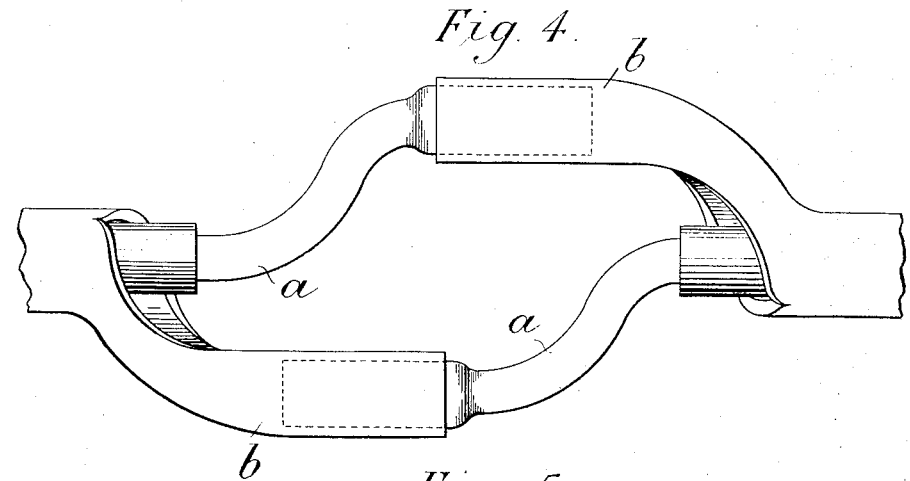
WITNESSES:
INVENTOR
PHILIP V. HUNTER
BY
Townsend & Decker
ATTORNEYS

UNITED STATES PATENT OFFICE.

PHILIP VASSAR HUNTER, OF NEWCASTLE-UPON-TYNE, ENGLAND.

CABLE FOR ELECTRIC-CURRENT-DISTRIBUTING SYSTEMS.

1,088,902. Specification of Letters Patent. Patented Mar. 3, 1914.

Application filed February 14, 1912, Serial No. 677,461. Renewed September 5, 1913. Serial No. 788,325.

*To all whom it may concern:*

Be it known that I, PHILIP VASSAR HUNTER, a subject of the King of Great Britain and Ireland, residing at Heaton, Newcastle-upon-Tyne, in the county of Northumberland, England, have invented Improvements in or Relating to Cables for Electric-Current-Distributing Systems, of which the following is a specification.

This invention relates to cables for electric systems of the kind in which current for power or lighting purposes is distributed with the aid of leads connected in parallel, as for example is necessary to secure protection in accordance with the arrangements described in the specification of my application for Letters Patent Serial No. 641,511 filed July 31st, 1911.

The object of the present invention is to provide a cheap construction of cable for carrying leads as aforesaid. For this purpose, the cable comprises a pair of leads of similar metal adapted to be used in parallel so that no appreciable difference of potential normally exists between them and separated from each other by insulating material that consequently need not be thick nor of a high grade or in other words is of abnormally low insulation value. In this way, in a distributing system, where heretofore the leads were carried in separate cables, the initial outlay is decreased since the cost of distributing systems embodying cables is practically proportionate to the number of cables employed and not to their capacity.

Figures 1, 2 and 3 of the accompanying drawings are sections of cables according to the invention. Figs. 4 and 5 are views illustrating different ways of arranging the cores of cables according to the invention.

Fig. 1 illustrates a cable for a three phase system having a pair of leads $a$, $b$ for each phase, the two leads of each pair being of similar electrical potential and arranged concentrically so as to be mutually inductive with a non-conducting separator $q$ between them and forming one core of the cable. As there is normally no difference of potential between the leads $a$, $b$ the non-conducting separator $q$ need have only sufficient insulating properties to withstand the momentary difference of pressure which would exist should a leakage occur from $a$ or $b$ to earth or another feeder. The two leads are extremely close together and have a maximum mutual induction. If it is desired to arrange the feeders so that the leads have equal impedance, the cable may be divided into an even number of equal lengths the inner conductor $a$ of one length being, as indicated in Fig. 4, connected to the other conductor $b$ of the adjacent length. This arrangement also prevents alteration to the division of current between the two leads by unequal inductive effects on the two leads of currents in adjacent feeders or earth.

In an alternative construction, shown in Fig. 2, the two leads $a$, $b$ of each pair of leads are arranged side by side, so as to be mutually inductive, with a non-conducting separator $q$ between them, each lead being, it may be, of semi-circular section as shown. The two leads may, as indicated in Fig. 5, be arranged spirally around each other to prevent unequal division of currents in the two leads due to the effect of currents in adjacent feeders or earth.

In a further alternative construction, shown in Fig. 3, two leads $a$, $b$ of solid semi-circular cross section, as in Fig. 2, are employed, and two pairs of leads $a^1$, $b^1$ of approximately hollow semi-circular cross-sectional shape such pairs being assembled to occupy concentrically arranged circular spaces in the cable at the center of which are arranged the two leads $a$, $b$.

The several duplex cores at different potential in the same cable are suitably insulated from each other but as the two leads of each core are of equal potential the separating material $q$ between them need not be of a highly insulating character, thus enabling the cables to be cheaply constructed.

Where the insulation value of the insulating material between the leads in the cables is spoken of as being abnormally low, is meant insulation value which would be deemed abnormally low in cables used for ordinary purposes of electric current distributing systems as employed at this date.

To further assist in ascertaining the limitations imposed upon the present invention I may state that I am aware that it has been proposed to separate stranded cores at different potentials by insulation material that is mechanically weak, with the intention, when an accident occurs of causing its destruction rather than destruction of the outer insulation, and that it has been proposed to combine with a single current carrying lead a lead of dissimilar metal not intended to carry current but to act to reduce the objectionable effects of capacity in telegraphy and telephony by rendering the conductor self inductive, the two leads being preferably separated by insulating material though not necessarily so.

What I claim is:—

1. In an electric distribution system, a cable comprising a pair of leads, insulating material of abnormally low insulation value separating such leads thereby enabling the leads to be used in parallel with no appreciable difference of potential between them, and insulating material surrounding said pair of leads, collectively, of a much greater insulating value than the material separating the leads, substantially as described.

2. In an electric distribution system, a cable comprising a pair of leads, material of abnormally low insulating value separating such leads thereby enabling the leads to be used in parallel with no appreciable difference of potential between them and in such close proximity one to another that the reaction of one upon the other by mutual induction with disturbance in the proportion of currents carried is rendered very pronounced, and material surrounding said pair of leads, that is collectively, of a much greater insulation value than the material separating the leads, substantially as described.

3. In an electric distribution system, a cable comprising a pair of leads, insulating material of abnormally low insulation value separating such leads, thereby enabling the leads to be used in parallel with no appreciable difference of potential between them, and insulating material surrounding such pair of leads, collectively, of a much greater insulation value than the material separating the leads, the leads being arranged to occupy different positions at intervals throughout the length of the cable to prevent alteration to the division of current between the two leads by unequal inductive effects due to extraneous currents.

4. In an electric distribution system, a cable comprising a pair of leads, material of an abnormally low insulation value separating such leads thereby enabling the leads to be used in parallel with no appreciable difference of potential between them and in such close proximity one to another that the reaction of one upon the other by mutual induction with disturbance in the proportion of currents carried by them is rendered very pronounced, and insulating material surrounding said pair of leads, collectively, of a much greater insulation value than the material separating the leads, the leads being each divided into an even number of sections of equal lengths and each section of each lead being connected to a non-corresponding section of the other lead.

5. In an electric current distribution system, a cable having cores separated one from another by insulation commensurate with the difference of potential required therebetween, each core comprising divided leads between which there is normally no difference of potential and separated by insulating material commensurate with the momentary difference of pressure which may exist between the leads should leakage occur.

6. In an electric current distribution system, a cable comprising a pair of leads of similar metal adapted to be used in parallel and so that no appreciable difference of potential exists between them and insulating material of abnormally low insulation value but mechanically strong, separating one lead from the other, substantially as set forth.

Signed at Newcastle-on-Tyne, England, this twenty ninth day of January, 1912.

PHILIP VASSAR HUNTER.

Witnesses:
H. NIXON,
FRED H. DUKE.